United States Patent Office 2,773,903
Patented Dec. 11, 1956

2,773,903

PROCESS FOR BENZOPHENONES (DIMETHYLFORMAMIDE)

William B. Hardy, Bound Brook, and Warren S. Forster, Somerville, N. J., assignors to American Cyanamid Company, New York, N. Y., a corporation of Maine No Drawing. Application July 18, 1955,
Serial No. 522,833

11 Claims. (Cl. 260—591)

This invention relates to a process for the preparation of benzophenones and most specifically, it relates to a process for the preparation of benzophenones of the structure:

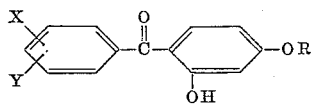

where X represents hydrogen, alkyl, alkoxy or halogen; Y represents hydrogen, alkyl, alkoxy, hydroxy or halogen; and R is alkyl.

It has become well known that certain benzophenones substituted with hydroxyl and alkoxy groups are very useful as ultraviolet absorbers for incorporation in various compositions. For example, such use is described and claimed in the copending application of Day, Hasler and Forster, Serial No. 346,792, filed April 3, 1953. Benzophenones of this type are extremely useful as UV light absorbers and may be used as such in a large variety of compositions. They are particularly usesful as UV light absorbers in resinous compositions such as unsaturated polyester resins and other resinous and plastic materials of various types such as polyvinyl chloride, styrene polymers, styrene, acrylonitrile polymers, acrylates such as methyl acrylate, methyl methacrylate, and the like.

In the past, several methods have been developed for the synthesis of these compounds. One of these comprises condensing various substituted benzenes with phosgene in the presence of aluminum chloride. This method is illustrated by the following equation:

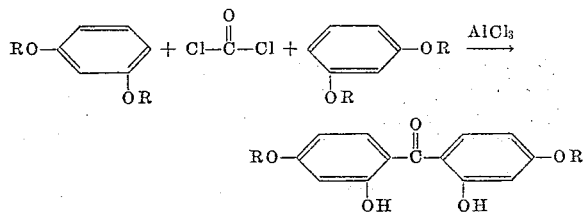

Another useful method for the preparation of these benzophenones is described in the application mentioned above. This is based on the following reaction:

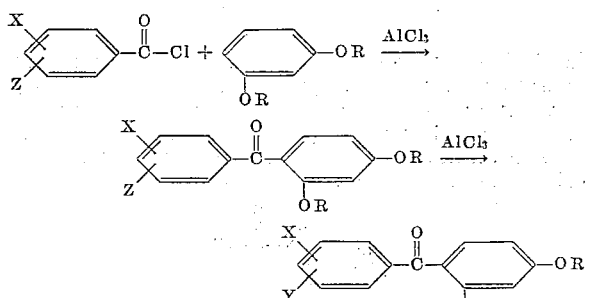

where X, Y, and R represent the members as designated above, and Z represents hydrogen, alkyl, alkoxy or halogen. A third method is the partial alkylation of a polyhydroxybenzophenone.

The second method is a more flexible chemical route to these compounds. The reaction is one of the Friedel-Crafts type wherein a benzoyl chloride is allowed to react with a 1,3-dialkoxy benzene in the presence of aluminum chloride. The final product is formed in situ in the reaction mixture by a dealkylation of the alkoxy group in the position ortho to the carbonyl group in the benzophenone. If the benzoyl chloride contains an ortho alkoxy group, dealkylation of this group will simultaneously take place to produce an additional hydroxyl group. Ordinarily the reaction is carried out in a solvent such as chlorobenzene, a chlorotoluene or a similar chlorinated hydrocarbon solvent of the aliphatic or aromatic series.

This reaction of a benzoyl chloride with a dialkoxybenzene, while a useful method with much more flexibility in synthesis has serious disadvantages as presently run, especially when a dialkoxy benzoyl chloride is used. Customarily, in the production of small amounts of these materials, as in the laboratory where the reaction is carried out in a small vessel, the reaction mixture tends to thicken and stirring becomes extremely difficult. In fact, the mixture often may set up almost solid, becoming completely unstirrable. In making small quantities in the laboratory this can sometimes be overcome by using a much larger quantity of solvent. It is also possible to remove the solid material mechanically or to introduce steam to decompose the mass. However, in the use of this reaction in large volume production, these disadvantages become extremely serious and actually prohibit the use of such a process in manufacture. The operation of mechanical removal of the solidified material from the vessel or decomposition of the mass with steam becomes a next to impossible operation, both from the hazard standpoint and from that of the qauntities to be handled and the limitations of the equipment to be used. However, processes using sufficient solvent have been used in spite of the economic disadvantages, because of the great utility of the products.

The phosgene method, which has also been used, also has disadvantages. One of the more obvious ones is that it can be used only for the synthesis of symmetrical compounds. Another is the inefficiency of Friedel-Crafts reactions with phosgene, since this type of reaction gives poor yields and more by-products.

While we do not wish to be limited as to the theory of these reactions, we believe that the synthetic route starting with an acid chloride proceeds in the two steps shown by the above equation. We believe that the first reaction proceeds rapidly and that the heating and further treatment is needed to effect the dealkylation. As evidence for this, it is possible, with the proper care in working up, to isolate undealkylated intermediate after mixing the reactants. We believe that the thickening of the reaction mixture which so complicates this route occurs because the complex, formed by the intermediate with aluminum chloride, comes out of solution.

We have now found that if, when the reaction begins to thicken as the mixture is heated, dimethyl formamide is added in small quantities to the reaction mixture an easily stirrable and pourable mixture is obtained. The quantity of dimethyl formamide which need be added is not too critical. A minimum of about 1–2% of dimethyl formamide, based on the amount of monochlorobenzene in the reaction mixture, is needed however. In practice, we prefer to use a quantity of dimethyl formamide which is about 5% of the amount of monochlorobenzene present in the reaction mixture. Larger quantities can be used, although they are not necessary and present an added expense.

It is most surprising that the addition of a small amount of this specific solvent will eliminate the severe disadvantage presented by running the reaction in monochlorobenzene. Other solvents do not have this effect; rather other solvents show the same phenomenon as monochlorobenzene in producing a thick unstirrable reaction mass. The peculiar specificity of dimethyl formamide could not be predicted.

Our invention can be illustrated by the following examples in which the parts are by weight unless otherwise specified:

*Example 1*

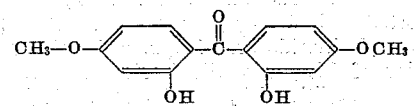

A mixture of 109 parts of dimethoxybenzoic acid, 176 parts of dry benzene, and 95 parts of thionyl chloride is prepared. This is heated at 50° C. until the acid chloride is formed. The excess thionyl chloride and the benzene solvent are then removed by vacuum distillation at 50° C. The acid chloride remains as a thick purple solution. To this is added 550 parts of chlorobenzene and 110 parts of 1,3-dimethoxybenzene. The reaction mixture is cooled to 12° in an ice bath and 160 parts of aluminum chloride is added gradually, keeping the reaction below 30° C. The reaction is then gradually heated to 115° C. with the evolution of hydrogen chloride gas. As the temperature increases, the reaction mixture becomes thicker. At 105° C., 25 ml. of dimethyl formamide is added slowly. The reaction is heated at 115° for a short time and is then poured into 130 ml. of concentrated hydrochloric acid. The reaction mixture pours very easily and very cleanly. The acid mixture is heated with steam to dissolve all the material which had not hydrolyzed and the mixture is filtered. The red chlorobenzene layer is separated and washed twice with hot water. To the chlorobenzene solution is then added 60 parts of sodium hydroxide dissolved in water and the chlorobenzene is removed by a steam distillation. After all of the chlorobenzene is removed, the precipitate which forms during the distillation is removed by filtration and discarded. The solution is cooled and acidified with hydrochloric acid, precipitating a tan solid. This is removed by filtration and washed acid-free. It is then treated with sodium bicarbonate solution to remove any acid present and is then washed with water to remove all traces of bicarbonate. After drying approximately 119 parts of product (72.3% of theory) is obtained.

*Example 2*

(Using no dimethylformamide)

The procedure of Example 1 is followed except that no dimethylformamide is added. The reaction mixture on heating becomes a thick mass and eventually a solid cake which can not be liquefied even when more chlorobenzene is added. The mixture is then scraped and chipped from the container into 2000 parts of ice and 250 parts of concentrated hydrochloric acid. The slurry is heated on a steam bath until hydrolysis is complete. The aqueous layer is separated and discarded. The red chlorobenzene layer is steam distilled and the residual mixture is worked up by the procedure described in Example 1. The yield is about half that of Example 1.

*Example 3*

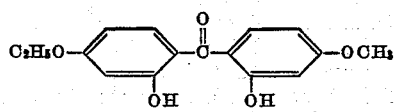

The procedure of Example 1 is followed, using an equivalent amount of 1,3-diethoxybenzene in place of the dimethoxybenzene. The reaction mass is readily stirrable after addition of the dimethoxyformamide.

*Example 4*

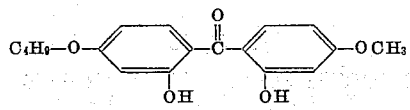

The procedure of Example 1 is followed, using an equivalent amount of 1,3-dibutoxybenzene in place of the dimethoxy benzene. The reaction mass is readily stirrable after addition of the dimethoxyformamide.

*Example 5*

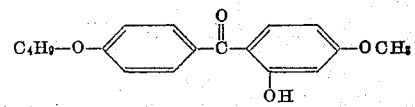

The procedure of Example 4 is used with an equivalent amount of 2,4-diethoxybenzoic acid replacing the dimethoxybenzoic acid. The reaction mass stirs easily after the dimethylformamide is added.

*Example 6*

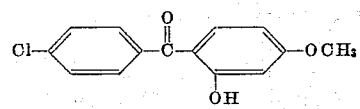

The procedure of Example 1 is followed, using an equivalent quantity of p-chlorobenzoylchloride in place of the acid chloride prepared in situ in that example. The reaction mass stirs easily after the dimethylformamide is added.

*Example 7*

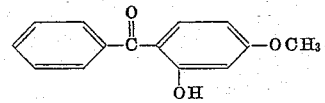

The procedure of Example 1 is followed, using an equivalent quantity of benzoyl chloride in place of the acid chloride prepared in situ in that example. The reaction mass stirs easily after the dimethylformamide is added.

*Example 8*

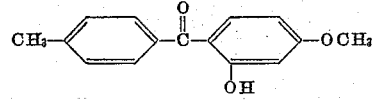

The procedure of Example 1 is followed, using an equivalent quantity of toluyl chloride in place of the acid chloride prepared in situ in that example. The reaction mass stirs easily after the dimethylformamide is added.

We claim:

1. A process of preparing a benzophenone of the structure:

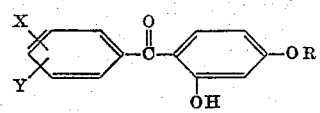

in which R is a lower alkyl group, X is selected from the group consisting of hydrogen, lower alkyl, lower alkoxy and halogen, and Y is selected from the group consisting of hydrogen, lower alkoxy, hydroxyl, lower alkyl and halogen which comprises forming a mixture of a benzoyl chloride of the structure:

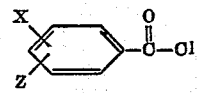

wherein X is the same as above, and Z is selected from the group consisting of hydrogen, lower alkyl, lower alkoxy and halogen with at least a substantially stoichiometric quantity of a 1,3-dialkoxy benzene and with at least a substantially stoichiometric quantity of aluminum chloride in an organic solvent, heating the mixture above 100° C. and adding thereto at least 1% by weight of dimethyl formamide of the weight of organic solvent present when the mixture begins to thicken.

2. The process of claim 1 in which the organic solvent is monochlorobenzene.

3. The process of claim 2 in which at least 3 parts but not more than 7 parts of chlorobenzene per part of aluminum chloride is used.

4. The process of claim 3 in which approximately 5% of dimethylformamide is used based on the weight of the chlorobenzene present.

5. The process of claim 4 in which the benzoyl chloride is a dialkoxy benzoyl chloride.

6. The process of claim 5 in which the benzoyl chloride is a dimethoxy benzoyl chloride.

7. The process of claim 6 in which the 1,3-dialkoxy benzene is a dimethoxy benzene.

8. The process of claim 6 in which the dialkoxy benzene is 1,3-diethoxy benzene.

9. The process of claim 6 in which the dialkoxy benzene is 1,3-dibutoxy benzene.

10. The process of claim 4 in which the benzoyl chloride is p-chlorobenzoyl chloride.

11. The process of claim 4 in which the benzoyl chloride is p-toluyl chloride.

No references cited.